United States Patent [19]

Korenberg

[11] 4,372,228

[45] Feb. 8, 1983

[54] FLUIDIZED BED REACTOR UTILIZING A CONICAL-SHAPED SUPPORT AND METHOD OF OPERATING THE REACTOR

[75] Inventor: Jakob Korenberg, York, Pa.

[73] Assignee: York-Shipley, Inc., York, Pa.

[21] Appl. No.: 213,318

[22] Filed: Dec. 5, 1980

[51] Int. Cl.³ .............................................. F23D 1/00
[52] U.S. Cl. .................................. 110/347; 34/57 A; 110/245; 110/263; 110/346; 165/104.16; 431/7; 431/170
[58] Field of Search .............. 110/245, 263, 259, 346, 110/347; 122/4 D; 431/7, 170; 165/104.16; 34/57 A; 432/58

[56] References Cited

U.S. PATENT DOCUMENTS

| | | | |
|---|---|---|---|
| 3,298,792 | 1/1967 | Di Drusco | 34/57 A X |
| 3,332,780 | 7/1967 | Smith, Jr. | 34/57 A X |
| 3,397,657 | 8/1968 | Tada | 110/245 |
| 3,540,388 | 11/1970 | Smith | 110/245 |
| 3,550,916 | 12/1970 | Hoppe et al. | 34/57 A X |
| 3,731,393 | 5/1973 | Okada et al. | 34/57 A X |
| 3,772,999 | 11/1973 | Miller, Jr. et al. | 110/245 |
| 3,776,150 | 12/1973 | Evans et al. | 110/245 |
| 3,892,046 | 7/1975 | Cooke | 34/57 A |
| 3,907,674 | 9/1975 | Roberts et al. | 110/245 X |
| 4,023,280 | 5/1977 | Schora et al. | 34/57 A X |
| 4,062,656 | 12/1977 | Blaser et al. | 34/57 A X |
| 4,075,953 | 2/1978 | Sowards | 110/245 |
| 4,177,742 | 12/1979 | Uemura et al. | 110/346 |
| 4,279,222 | 7/1981 | Pearce | 110/263 X |

FOREIGN PATENT DOCUMENTS 1402543  8/1975  United Kingdom .

Primary Examiner—Edward G. Favors
Attorney, Agent, or Firm—Finnegan, Henderson, Farabow, Garrett & Dunner

[57] ABSTRACT

A bed support, and a fluidized bed reactor incorporating the bed support, the bed support including a conical-shaped support with downwardly converging surfaces terminating in a conduit for removing tramp material and/or agglomerated material from the reactor. The downwardly converging surfaces have main air source nozzles for directing pressurized air parallel to and downwardly along the downwardly converging surfaces toward the conduit. In a first embodiment, the conduit has downwardly diverging walls. In a second embodiment, the conical-shaped support further includes an inverted cone positioned over the conduit, the inverted cone having central air source nozzles and slots in the lower portion of the cone. In a third embodiment, the conical-shaped support further includes a bar grate having central air source nozzles positioned within the conduit. The method of operating the fluidized bed reactor includes directing pressurized air parallel to and downwardly along the downwardly converging surfaces toward the conduit for fluidizing the bed and for preventing tramp material and/or agglomerated material from collecting on the downwardly converging surfaces, and removing tramp material and/or agglomerated material from the reactor through the conduit.

27 Claims, 12 Drawing Figures

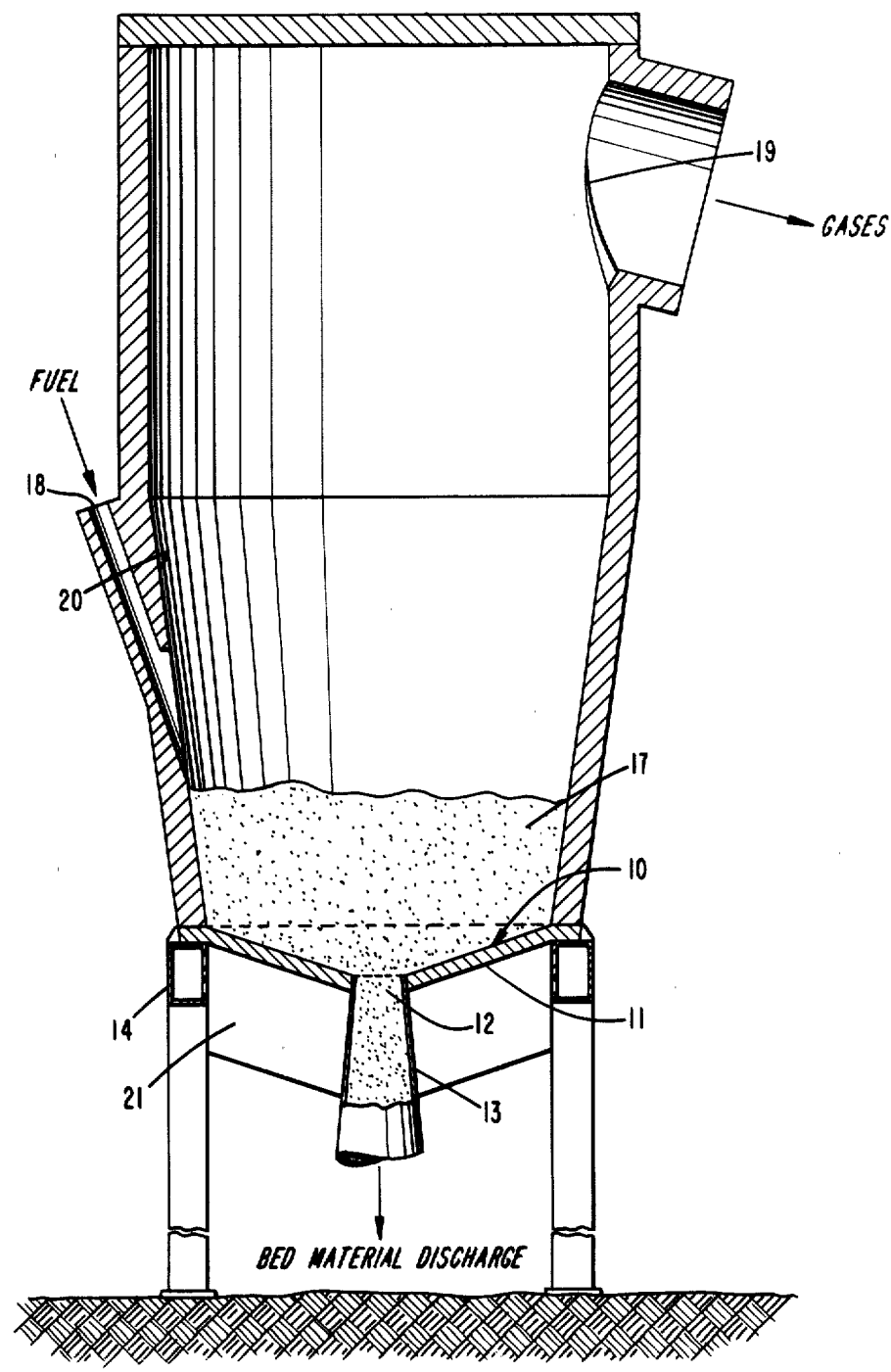

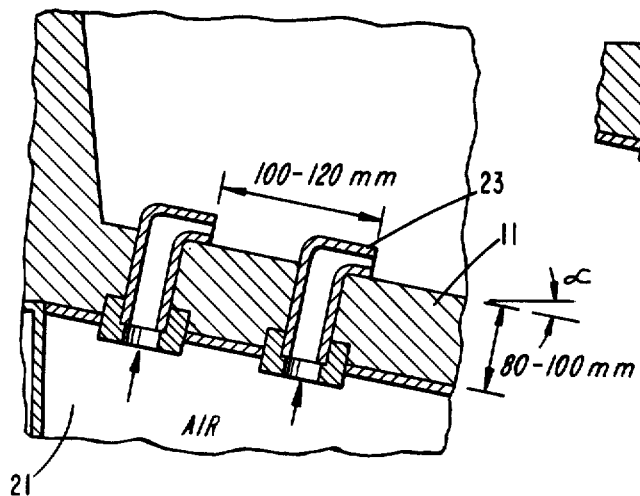
Fig. 2A
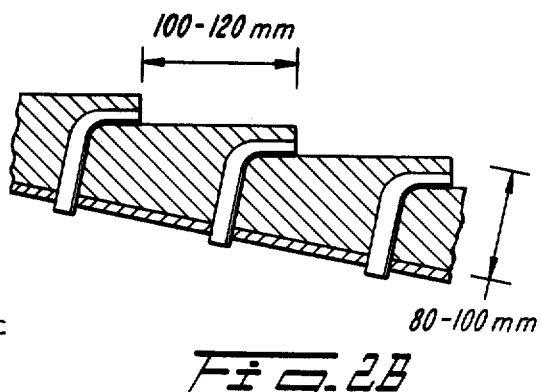
Fig. 2B
Fig. 2D
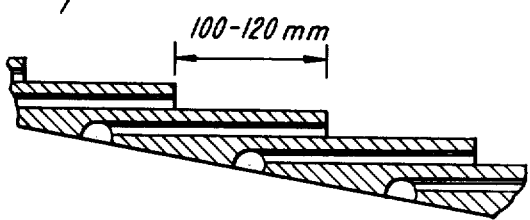
Fig. 2C
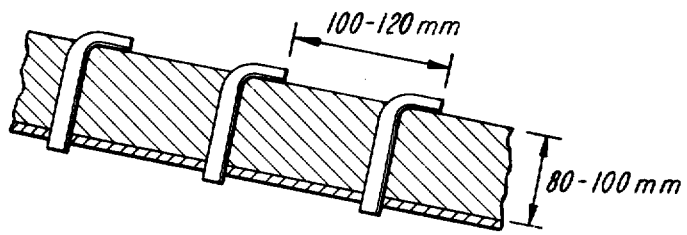

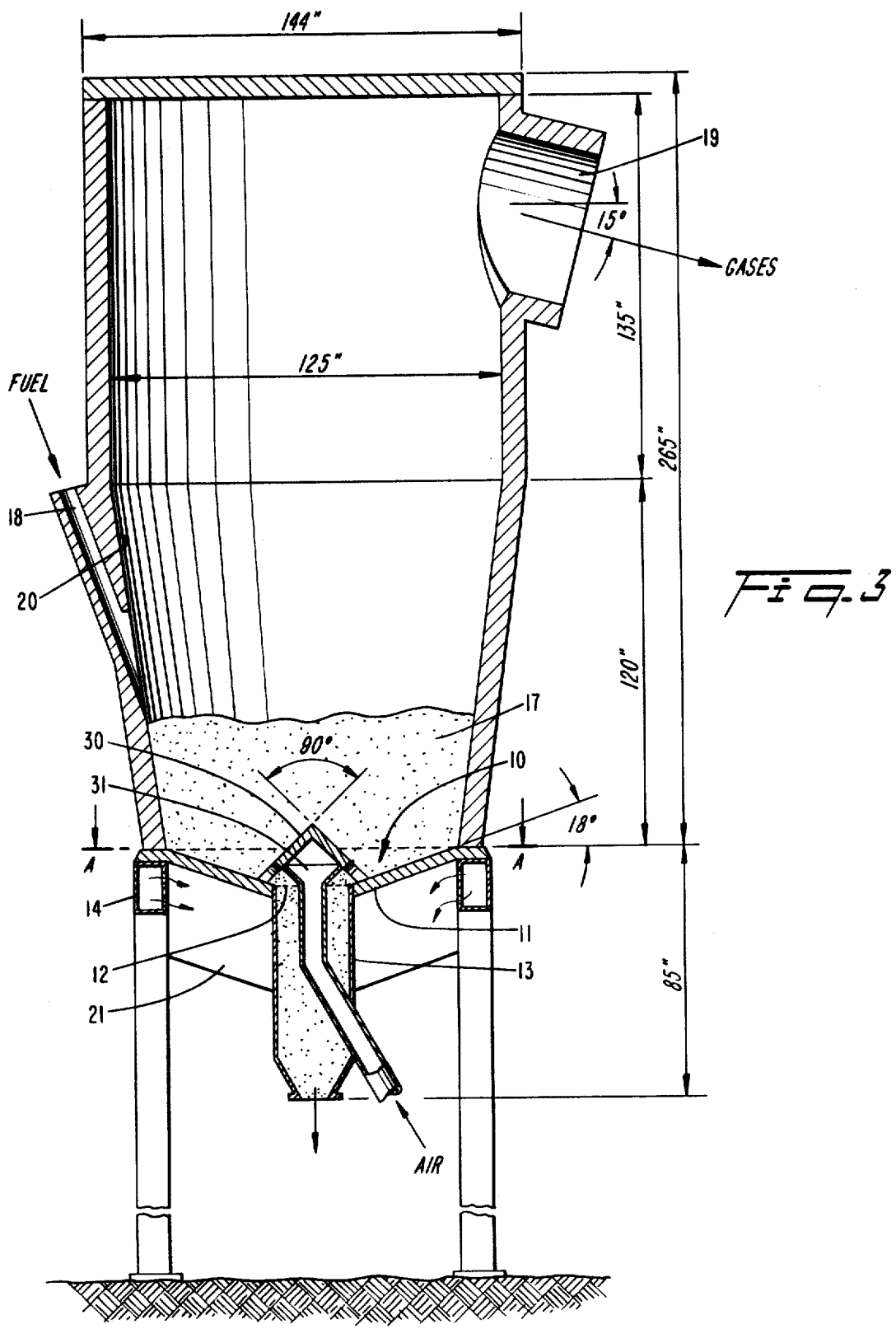

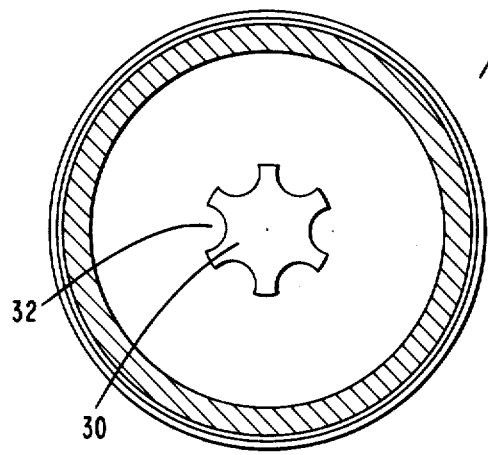
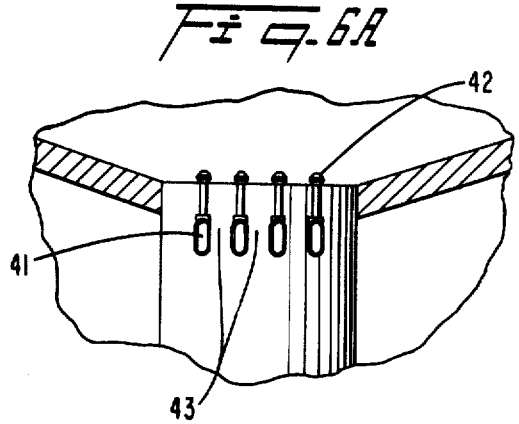
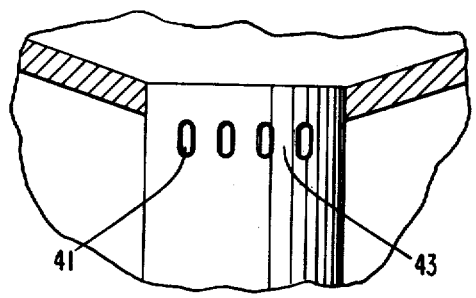
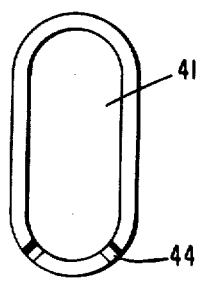
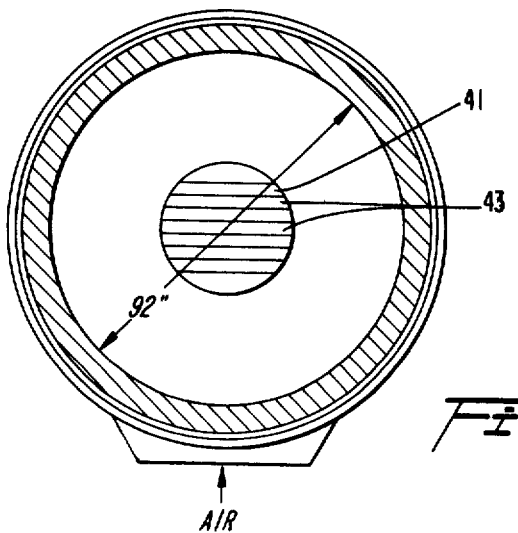

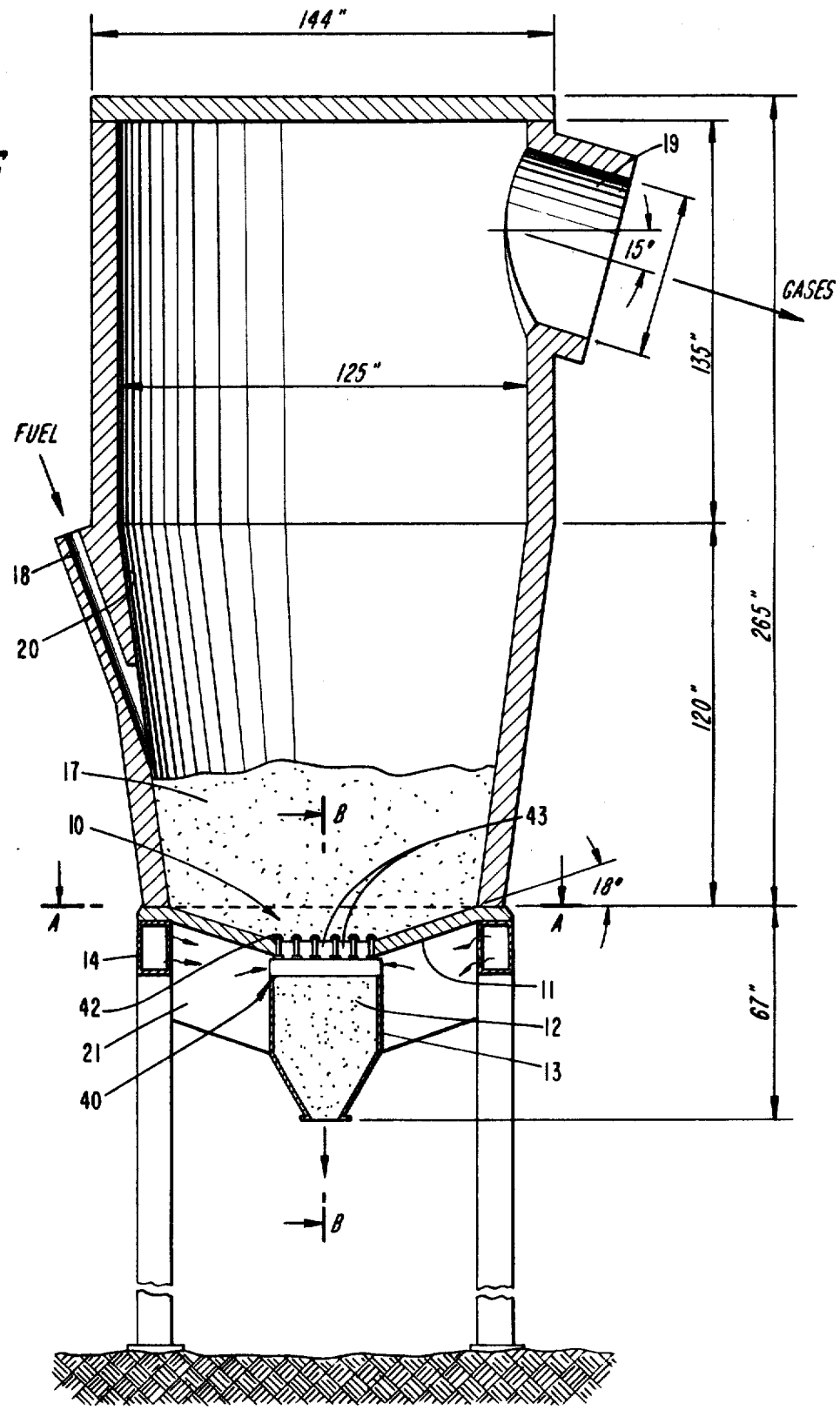

FLUIDIZED BED REACTOR UTILIZING A CONICAL-SHAPED SUPPORT AND METHOD OF OPERATING THE REACTOR

BACKGROUND OF THE INVENTION

The present invention is directed to a fluidized bed reactor, and, particularly, to a fluidized bed reactor utilizing a conical-shaped support for the bed through which uncombusted material is removed from the reactor and a method for operating the fluidized bed reactor.

In fluidized bed reactors for combusting particulate material, the material to be combusted is generally fed over or into a bed of granular material, usually sand. In the past, two major types of surfaces have been used to support the bed of granular material, namely bar grates and plate grates.

A bar grate is designed to permit air or other gases to pass up through the bed and to permit refuse in the form of uncombustible tramp material and/or agglomerated material to pass through the parallel spaces formed between adjacent bars and to be removed from the bottom of the reactor. In this type of grate, air is provided to a manifold that distributes the air to individual hollow bars connected to the manifold. The bars, in turn, have air nozzles that distribute the fluidizing air into the bed. An example of such a conventional bar grate is disclosed in U.S. Pat. No. 4,075,953 to Sowards, specifically in the embodiment depicted in FIG. 11 of that patent, and in U.S. Pat. No. 3,892,046 to Cooke.

A plate grate, unlike a bar grate, does not permit tramp material and/or agglomerated material to be removed from the bottom of the reactor. Instead, the plate, which is usually in the form of a flat surface, has air nozzles that distribute the fluidizing air into the bed. Air is supplied to the nozzles from an air box located below the plate. An example of such a conventional plate grate is also disclosed in U.S. Pat. No. 4,075,953, supra, specifically in the embodiment depicted in FIG. 1 of that patent, and in U.S. Pat. No. 3,907,674 to Roberts et al.

The above-discussed prior art grates have certain disadvantages that can limit the operating times of the fluidized bed. The bar grate, despite having parallel spaces between the bars through which granular material, tramp material, and/or agglomerated material can fall, tends to restrict the flow of material or to accumulate material as it passes between the parallel sides of adjacent bars. After a period of operation, the upper surface of the grate becomes covered by a static layer of tramp material and/or agglomerated material. Moreover, granular bed material tends to enter the nozzles and accumulate in the bars, which bars are difficult to clean out. As a result, the fluidization of the bed, along with the effectiveness of the reactor, decreases. Another disadvantage of the prior art bar grates is that since the bar grate extends along the entire base of the reactor, the hopper that is located below the reactor must be coextensive with the entire reactor diameter. For large diameter reactors, the cost of the required hopper can be significant.

The plate grate suffers from the severe shortcoming of having no means by which tramp material and/or agglomerated material can be removed from the entire bed during operation. Such material can only be removed by shutting down the bed.

In addition to the bar and plate grates discussed above, conical-shaped support surfaces also have been used to support a bed of granular material. In U.S. Pat. No. 4,177,742 to Uemura et al. a conical-shaped support surface with a centrally disposed port is disclosed through which tramp material and/or agglomerated material is removed from the reactor. If the angle of inclination of the support surface is increased, the removal of tramp material and/or agglomerated material is facilitated. However, when the angle of inclination is increased, the height of the bed, particularly near the center of the reactor, will also increase. Consequently, the energy required to fluidize the bed increases. This is particularly significant with large diameter reactors.

SUMMARY OF THE INVENTION

The present invention has solved the problem of tramp material and/or agglomerated material build-up that can cause the shutdown of a fluidized bed combustor.

In accordance with the present invention, a bed support for use in a fluidized bed reactor comprises conduit means for removing tramp material and/or agglomerated material from the reactor, a conical-shaped support including downwardly converging surfaces terminating in the conduit means, and main air source means extending from the downwardly converging surfaces for directing pressurized air parallel to and downwardly along the surfaces toward the conduit means.

In the first embodiment of the invention, the conduit means can include downwardly diverging walls extending from the conical-shaped support.

In the second embodiment of the invention, the conical-shaped support can further include an inverted cone positioned over the conduit means, the inverted cone having central air source means for directing pressurized air parallel to and downwardly along the inverted cone. In this embodiment, the conduit means includes a plurality of slots in the lower portion of the cone.

In the third embodiment of the invention, the conical-shaped support can further include a bar grate having a plurality of spaced-apart bars, each bar preferably being oval-shaped, positioned within the conduit means, the bars having central air source means for distributing pressurized air to the reactor. In this embodiment, the conduit means includes the spaces between the bars.

In all three embodiments, the downwardly converging surfaces of the conical-shaped support preferably form an angle with the horizontal that ranges from 6° to less than 30°. Most preferably, the angle ranges from 6° to 15°. Preferably, the main air source means include inverted L-shaped nozzles.

The present invention is also directed to a fluidized bed reactor comprising peripheral walls forming a reactor bed, conduit means for removing tramp material and/or agglomerated material from the reactor, a conical-shaped support including downwardly converging surfaces terminating in the conduit means, and main air source means extending from the downwardly converging surfaces for directing pressurized air parallel to and downwardly along the surfaces toward the conduit means.

In the first embodiment of the fluidized bed reactor, the conduit means can include downwardly diverging walls extending from the conical-shaped support. Preferably, in this first embodiment the fluidized bed reactor further comprises chamber means located below the downwardly converging surfaces of the conical-shaped support and in fluid communication with the main air source means, and means to supply pressurized air to the chamber means.

In the second embodiment of the fluidized bed reactor, the conical-shaped support can further include an inverted cone positioned over the conduit means, the inverted cone having central air source means for directing pressurized air parallel to and downwardly along the inverted cone. In this embodiment, the conduit means includes a plurality of slots in the lower portion of the cone. Preferably, the fluidized bed reactor of the second embodiment further comprises chamber means located below the downwardly converging surfaces and in fluid communication with the main air source means, means to supply pressurized air to the chamber means, and means to supply pressurized air to the central air source means that is independent of the means to supply pressurized air to the chamber means.

In the third embodiment of the fluidized bed reactor, the conical-shaped support can further include a bar grate having a plurality of spaced-apart bars positioned within the conduit means, the bars having central air source means for distributing pressurized air to the reactor. In this embodiment, the conduit means include the spaces between the bars. Preferably, the fluidized bed reactor of the third embodiment further comprises chamber means located below the downwardly converging surfaces and in fluid communication with both the main air source means and central air source means, and means to supply pressurized air to the chamber means.

In the first embodiment, the conduit means, which can include a centrally disposed opening, has a diameter that preferably does not exceed 8 inches. In the second and third embodiments, the conduit means, which can include a centrally disposed opening, has a diameter preferably less than 50% of the maximum diameter of the conical-shaped support, and most preferably less than 30% of the maximum diameter of the conical-shaped support.

In addition to the above-described bed support and fluidized bed reactor, the present invention is also directed to a method of operating a fluidized bed reactor for combusting non-uniform particulate matter, the bed including granular material and accumulated tramp material and/or agglomerated material, the method comprising providing a conical-shaped support for supporting the granular bed and the particulate matter fed into the reactor for combustion, the conical-shaped support including downwardly converging surfaces that terminate in a conduit, directing pressurized air parallel to and downwardly along the downwardly converging surfaces toward the conduit for fluidizing the bed and for preventing tramp material and/or agglomerated material from collecting on the downwardly converging surfaces, and removing tramp material and/or agglomerated material from the reactor through the conduit.

As previously discussed, the apparatus and method of the present invention eliminates the problem of tramp material and/or agglomerated material build-up on the support surface. This is accomplished by using a conical-shaped support having the unique combination of downwardly converging surfaces terminating in conduit means, coupled with main air source means directing pressurized air parallel to and downwardly along the downwardly converging surfaces toward the conduit means. The use of the main air source means in accordance with the present invention prevents tramp material and/or agglomerated material build-up even when the slope of the downwardly converging surfaces is small. By using smaller slopes, the bed height near the center of the bed is reduced and, consequently, the energy required to fluidize the bed is also reduced. Moreover, since the tramp material and/or agglomerated material can only pass through the conduit means, and since the conduit means constitutes only a portion of the conical-shaped support, the size and cost of the hopper located below the conical-shaped support is substantially less than the size and cost of the hopper required with the prior art bar grate supports.

The second and third embodiments of present invention have an additional advantage that is significant with large size reactors. Specifically, the presence of a centrally disposed conduit means results in a decrease in the height of the bed of granular material near the center of the reactor. Consequently, the energy required to fluidize the bed is further decreased, which can be significant for large size reactors.

BRIEF DESCRIPTION OF THE DRAWINGS

FIG. 1 is a vertical sectional view of a fluidized bed reactor in accordance with the first embodiment of the invention.

FIGS. 2A-2D are vertical sectional views of various embodiments of the main air source means used in the present invention.

FIG. 3 is a vertical sectional view of a fluidized bed reactor in accordance with the second embodiment of the invention.

FIG. 4 is a horizontal sectional view taken along line A—A of FIG. 3 showing a bed support in accordance with the second embodiment of the present invention.

FIG. 5 is a vertical sectional view of a fluidized bed reactor in accordance with the third embodiment of the invention.

FIG. 6A is a partial vertical sectional view along line B—B of FIG. 5 showing one embodiment of a bar grate in accordance with the third embodiment of the present invention.

FIG. 6B is a partial vertical sectional view along line B—B of FIG. 5, showing an alternative embodiment of a bar grate in accordance with the third embodiment of the present invention.

FIG. 6C is an enlarged vertical sectional view of a bar of the bar grate of FIG. 6B.

FIG. 7 is a horizontal sectional view taken along line A—A of FIG. 5 showing a bed support in accordance with the third embodiment of the present invention.

DESCRIPTION OF THE PREFERRED EMBODIMENTS

In order to more specifically define the present invention reference will be made to the accompanying drawings, which are incorporated in and constitute a part of this specification, that illustrate preferred embodiments of this invention.

The first embodiment of the bed support and fluidized bed reactor of the present invention is depicted in FIG. 1. As seen in FIG. 1, the fluidized bed reactor has peripheral walls 20 that form a reactor bed in which a bed of granular material 17 is retained. The selection of the granular material will turn on the intended use of the reactor. Preferably, when the reactor is used as a combustor, the granular material is sand or other inert granular material. The material to be combusted is introduced into the reactor through inlet 18. This material can be non-uniform particulate material, such as wood waste, municipal refuse, carbonaceous material, etc. The gases generated in the reactor are removed through outlet 19.

The granular material and material to be combusted are supported by bed support 10. The bed support 10 is a conical-shaped support having downwardly converging surfaces 11 that terminate in conduit means for removing tramp material and/or agglomerated material from the reactor. As depicted in FIG. 1, the conduit means can be a centrally disposed opening 12 having downwardly diverging walls 13 extending from the downwardly converging surfaces 11. Preferably, the diameter of opening 12 does not exceed 8 inches. As a result of the wall's 13 being downwardly diverging, the tramp material and/or agglomerated material need pass only one point of contact before falling through. Consequently, the likelihood of such material jamming between the walls 13 is minimized.

An important feature of the present invention is the use of main air source means extending from the downwardly converging surfaces 11 for directing pressurized air parallel to and downwardly along the surfaces 11 toward the conduit means. The main air source means performs the dual function of fluidizing the bed of granular material and preventing tramp material and/or agglomerated material from collecting on the downwardly converging surfaces 11. Any type of main air source means capable of directing the flow of pressurized air can be used. Several embodiments of main air source means are shown in FIGS. 2A to 2D. The preferred embodiment is depicted in FIG. 2A. In this embodiment, a multiplicity of inverted L-shaped nozzles 23 are used that extend from the downwardly converging surfaces 11. Preferably, the radial distance between adjacent nozzles 23 is 100 to 120 mm, and the thickness of the downwardly converging surfaces 11 through which the nozzles 23 extend is 80 to 100 mm.

As seen in FIG. 2A, the downwardly converging surfaces 11 form an angle α with the horizontal. As the angle α increases, the removal of tramp material and/or agglomerated material from bed support 10 is facilitated. However, increasing the angle α also increases the height of the bed of granular material and, consequently, the amount of energy needed to fluidize the bed. By using the main air source means in accordance with the present invention to direct air parallel to and downwardly along surfaces 11 toward opening 12, the removal of tramp material and/or agglomerated material from bed support 10 is effected even when the angle α is relatively small. Preferably, the angle α ranges from 6° to less than 30°, and most preferably the angle α ranges from 6° to 15°. By using a smaller angle α, the height of the bed, particularly near the center of the bed, is reduced and, consequently, the energy required to fluidize the bed is also reduced.

The remaining embodiments for the main air source means depicted in FIGS. 2B to 2D will not be described in detail. However, it should be noted that although the embodiment depicted in FIG. 2D can be used in the present invention it is not preferred. Specifically, the nozzle of FIG. 2D creates too high of a pressure drop because of the length of the nozzle.

As seen in FIG. 1, the fluidized bed reactor in accordance with the first embodiment of the present invention preferably further includes chamber means 21 located below the downwardly converging surfaces 11.

Referring to FIG. 2A, the chamber means 21 is in fluid communication with the nozzles 23. The reactor further includes means to supply pressurized air to the chamber means 21, shown in FIG. 1 as an air plenum 14 in fluid communication with chamber means 21.

The second embodiment of the bed support and fluidized bed reactor of the present invention is depicted in FIGS. 3 and 4. The same reference numerals as in FIG. 1 have been used to refer to the same or similar elements. The following discussion of the second embodiment will be primarily limited to the differences from the first embodiment.

Referring to FIG. 3, the downwardly converging surfaces 11 of bed support 10 terminate in conduit means for removing tramp material and/or agglomerated material from the reactor. The conduit means is shown as a centrally disposed opening 12 terminating in a hopper 13. The opening 12, which is larger than the corresponding opening in FIG. 1, preferably has a diameter that is less than 50% of the maximum diameter of the conical-shaped support, and most preferably less than 30% of the maximum diameter of the conical-shaped support.

In this second embodiment, the conical-shaped support having downwardly converging surfaces 11 is provided with an additional element, namely, an inverted cone 30 positioned over the opening 12. Preferably, a right-angle cone is used, although the included angle can exceed 90°. As seen in FIG. 4, the lower portion of the cone 30 is provided with a plurality of slots 32. The slots 32 are part of the conduit means inasmuch as they are in communication with opening 12, thereby permitting tramp material and/or agglomerated material to be removed from the reactor.

Although not shown in FIG. 3, the surfaces 11 are also equipped with the main air source means depicted in one or more of FIGS. 2A to 2D. As in the first embodiment, the inverted L-shaped nozzles 23 shown in FIG. 2A are preferred.

The inverted cone 30 has central air source means extending through its surface for directing pressurized air parallel to and downwardly along the cone 30. Any device capable of directing the flow of pressurized air can be used. For example, one or more of the nozzle structures depicted in FIGS. 2A to 2D can be used for the central air source means. As with the main air source means extending through surfaces 11, the preferred central air source means are the inverted L-shaped nozzles 23 depicted in FIG. 2A.

The fluidized bed reactor in accordance with the second embodiment of the invention additionally has means to supply pressurized air to the central air source means that is independent of the means to supply pressurized air to the main air source means extending through surfaces 11. Referring to FIG. 3, this means is shown as an air box 31 in fluid communication with the central air source means extending from the inverted cone 30. The air box 31 is independent of chamber 21 and air plenum 14.

The third embodiment of the bed support and fluidized bed reactor of the present invention is shown in FIGS. 5 to 7. As in the previous discussion of the second embodiment, the same reference numerals as in FIG. 1 have been used to refer to the same or similar elements. The following discussion of the third embodiment will be primarily limited to the differences from the first embodiment.

The downwardly converging surfaces 11 of bed support 10 terminate in conduit means for removing tramp material and/or agglomerated material from the reactor. The conduit means is shown as a centrally disposed opening 12 terminating in a hopper 13. As in the second embodiment, the opening 12, which is larger than the corresponding opening in FIG. 1, preferably has a diameter that is less than 50% of the maximum diameter of the conical-shaped support, and most preferably less than 30% of the maximum diameter of the conical-shaped support.

In this third embodiment, the conical-shaped support having downwardly converging surfaces 11 is provided with an additional element, namely, a bar grate 40 with spaced-apart grate bars 41, prefeably oval-shaped, positioned within opening 12. The spaces 43 between bars 41 are part of the conduit means inasmuch as they are in communication with opening 12, thereby permitting tramp material and/or agglomerated material to be removed from the reactor.

The bar grate 40 has central air source means for distributing pressurized air to the reactor. As seen in FIG. 6A, the central air source means can include nozzles 42 extending from bars 41. Alternatively, as seen in FIGS. 6B and 6C, instead of nozzles 42 the central air source means can include orifices 44 located in the lower portion of bars 41. Chamber means 21 is in fluid communication with both the main air source means extending through surfaces 11 and the nozzles 42 or orifices 44 of bar grate 40.

When large size reactors are required, the second and third embodiments must be used. In either embodiment, the size of the hopper 13 is substantially less than the size of the hoppers used with prior art bar grates. The reason is that in the present invention, as previously discussed, the diameter of opening 12 represents only a portion of the diameter of the bed support 10, and the diameter of hopper 13 need be only as large as the diameter of opening 12. In prior art bar grates, on the other hand, the bar grate constitutes the entire bed support, and the hopper must be coterminous with the bar grate. Consequently, for comparably sized reactors, each embodiment of the present invention results in a significant reduction in the size and cost of the hopper.

An additional advantage of the second and third embodiments is that the presence of centrally disposed opening 12 results in a reduction in the height of the bed near the center of the reactor. Consequently, the energy required to fluidize the bed is reduced, which can be significant for large size reactors.

The third embodiment of the present invention is preferred with large size reactors since it requires only one source of pressurized air, is simpler in construction than the second embodiment, and has conduit means with more space for tramp material and/or agglomerated material to pass from the reactor bed.

In FIGS. 3, 5, and 7, illustrative dimensions are given for the bed support and reactor. Needless to say, any desired dimensions can be chosen.

In operating the fluidized bed reactor in accordance with any of the above-described embodiments, non-uniform particulate matter is introduced through opening 18. The pressurized air for fluidizing the bed is introduced through at least the main air source means (nozzles 23 in FIG. 2A) that extend from downwardly converging surfaces 11. Since the surfaces 11 are downwardly converging and the main air source means directs pressurized air parallel to and downwardly along surfaces 11 toward the conduit means, tramp material and/or agglomerated material are prevented from accumulating on the bed support 10 and the removal of this material through the conduit means is facilitated.

Although the invention has been described in the environment of combusting non-uniform particulate material, it is apparent that the apparatus and method of the invention can be used in other environments in which fluidized bed reactors find utility.

It will be apparent to those of ordinary skill in the art that various modifications and variations can be made to the above-described embodiments without departing from the scope of the appended claims and their equivalents.

What is claimed is:

1. A bed support for use in a fluidized bed reactor comprising:
   conduit means for removing tramp material and/or agglomerated material from the reactor;
   conical-shaped support including downwardly converging surfaces terminating in said conduit means; and
   main air source means extending from said downwardly converging surfaces and directing a net component of pressurized air parallel to and downwardly along said surfaces toward said conduit means both for fluidizing the bed and for preventing tramp material and/or agglomerated material from collecting on said downwardly converging surfaces.

2. The bed support of claim 1 wherein said conduit means includes downwardly diverging walls extending from said conical-shaped support.

3. The bed support of claim 1 wherein:
   said conical-shaped support further includes an inverted cone positioned over said conduit means, said inverted cone having central air source means for directing pressurized air parallel to and downwardly along said inverted cone; and
   said conduit means includes a plurality of slots in the lower portion of said cone.

4. The bed support of claim 1 wherein:
   said conical-shaped support further includes a bar grate having a plurality of spaced-apart bars positioned within said conduit means, said bars having central air source means for distributing pressurized air to said reactor; and
   said conduit means includes the spaces between said bars.

5. The bed support of claim 1, 2, 3, or 4 wherein said downwardly converging surfaces form an angle with the horizontal that ranges from 6° to less than 30°.

6. The bed support of claim 5 wherein said angle ranges from 6° to 15°.

7. The bed support of claim 1, 2, 3, or 4 wherein said main air source means includes inverted L-shaped nozzles.

8. The bed support of claim 3 wherein both said main air source means and said central air source means include inverted L-shaped nozzles.

9. The bed support of claim 3 or 4 wherein said conduit means further includes a centrally disposed opening that has a diameter that is less than 50% of the maximum diameter of said conical-shaped support.

10. The bed support of claim 9 wherein the diameter of said centrally disposed opening is less than 30% of the maximum diameter of said conical-shaped support.

11. A fluidized bed reactor comprising:

peripheral walls forming a reactor bed;

conduit means for removing tramp material and/or agglomerated material from the reactor;

conical-shaped support including downwardly converging surfaces terminating in said conduit means; and main air source means extending from said downwardly converging surfaces and directing a net component of pressurized air parallel to and downwardly along said surfaces toward said conduit means both for fluidizing the bed and for preventing tramp material and/or agglomerated material from collecting on said downwardly converging surfaces.

12. The fluidized bed reactor of claim 11 wherein said conduit means includes downwardly diverging walls extending from said conical-shaped support.

13. The fluidized bed reactor of claim 11 wherein:

said conical-shaped support further includes an inverted cone positioned over said conduit means, said inverted cone having central air source means for directing pressurized air parallel to and downwardly along said inverted cone; and said conduit means includes a plurality of slots in the lower portion of said cone.

14. The fluidized bed reactor of claim 11 wherein:

said conical-shaped support further includes a bar grate having a plurality of spaced-apart bars positioned within said conduit means, said bars having central air source means for distributing pressurized air to said reactor; and said conduit means includes the spaces between said bars.

15. The fluidized bed reactor of claim 12 further comprising:

chamber means located below said downwardly converging surfaces and in fluid communication with said main air source means; and means to supply pressurized air to said chamber means.

16. The fluidized bed reactor of claim 13 further comprising:

chamber means located below said downwardly converging surfaces and in fluid communication with said main air source means;

means to supply pressurized air to said chamber means; and means to supply pressurized air to said central air source means that is independent of said means to supply pressurized air to said chamber means.

17. The fluidized bed reactor of claim 14 further comprising:

chamber means located below said downwardly converging surfaces and in fluid communication with both said main air source means and said central air source means; and means to supply pressurized air to said chamber means.

18. A fluidized bed reactor comprising:

peripheral walls forming a reactor bed;

conduit means having downwardly diverging walls for removing tramp material and/or agglomerated material from the reactor;

conical-shaped support having downwardly converging surfaces terminating in said conduit means;

main air source means extending from said downwardly converging surfaces and directing a net component of pressurized air parallel to and downwardly along said downwardly converging surfaces toward said conduit means both for fluidizing the bed and for preventing tramp material and/or agglomerated material from collecting on said downwardly converging surfaces;

chamber means located below said downwardly converging surfaces and in fluid communication with said main air source means; and means to supply pressurized air to said chamber means.

19. A fluidized bed reactor comprising:

peripheral walls forming a reactor bed;

conduit means for removing tramp material and/or agglomerated material from the reactor;

conical-shaped support including downwardly converging surfaces terminating in said conduit means, and further including an inverted cone positioned over said conduit means;

a plurality of slots in the lower portion of said inverted cone forming part of said conduit means;

main air source means extending from said downwardly converging surfaces and directing pressurized air parallel to and downwardly along said downwardly converging surfaces toward said conduit means both for fluidizing the bed and for preventing tramp material and/or agglomerated material from collecting on said downwardly converging surfaces;

chamber means located below said downwardly converging surface and in fluid communication with said main air source means;

means to supply pressurized air to said chamber means;

central air source means extending from said inverted cone for directing pressurized air parallel to and downwardly along said inverted cone; and means to supply pressurized air to said central air source means that is independent of said means to supply pressurized air to said chamber means.

20. A fluidized bed reactor comprising:

peripheral walls forming a reactor bed;

conduit means for removing tramp material and/or agglomerated material from the reactor;

conical-shaped support including downwardly converging surfaces terminating in said conduit means, and further including a bar grate having a plurality of spaced-apart bars positioned within said conduit means;

main air source means extending from said downwardly converging surfaces and directing pressurized air parallel to and downwardly along said downwardly converging surfaces toward said conduit means both for fluidizing the bed and for preventing tramp material and/or agglomerated material from collecting on said downwardly converging surfaces;

central air source means extending from said bars for distributing pressurized air to said reactor;

chamber means located below said downwardly converging surfaces and in fluid communication with both said main air source means and said central air source means; and means to supply pressurized air to said chamber means.

21. The fluidized bed reactor of claim 11, 12, 13, 14, 15, 16, 17, 18, 19, or 20 wherein said downwardly converging surfaces form an angle with the horizontal that ranges from 6° to less than 30°.

22. The fluidized bed reactor of claim 21 wherein said angle ranges from 6° to 15°.

23. The fluidized bed reactor of claim 18, 19, or 20 wherein said main air source means includes inverted L-shaped nozzles.

24. The fluidized bed reactor of claim 19 wherein both said main air source means and said central air source means include inverted L-shaped nozzles.

25. The fluidized bed reactor of claim 13, 14, 16, 17, 19, or 20 wherein said conduit means further includes a centrally disposed opening that has a diameter that is less than 50% of the maximum diameter of said conical-shaped support.

26. The fluidized bed reactor of claim 25 wherein the diameter of said centrally disposed opening is less than 30% of the maximum diameter of said conical-shaped support.

27. A method of operating a fluidized bed reactor for combusting non-uniform particulate matter, the bed including granular material and accumulated tramp material and/or agglomerated material, the method comprising:
providing a conical-shaped support for supporting the granular bed and the particulate matter fed into the reactor for combustion, said conical-shaped support including downwardly converging surfaces that terminate in a conduit;
directing a net component of pressurized air parallel to and downwardly along said downwardly converging surfaces toward said conduit for fluidizing said bed and for preventing tramp material and/or agglomerated material from collecting on said downwardly converging surfaces; and
removing tramp material and/or agglomerated material from the reactor through said conduit.

* * * * *